United States Patent [19]

Alvino et al.

[11] Patent Number: 4,895,673

[45] Date of Patent: Jan. 23, 1990

[54] EMULSIONS FOR ELECTRODEPOSITING POLYMERIC ALLOYS AND COPOLYMERS

[75] Inventors: William M. Alvino, Penn Hills Township, Allegheny County; Ram S. Raghava, Murrysville, both of Pa.

[73] Assignee: Westinghouse Electric Corp., Pittsburgh, Pa.

[21] Appl. No.: 755,135

[22] Filed: Jul. 12, 1985

[51] Int. Cl.$^4$ .................. B01J 13/00; C08J 3/08; C09K 3/00

[52] U.S. Cl. .................. 252/308; 156/279; 252/183.11; 252/314; 428/284; 428/288; 524/901; 524/923

[58] Field of Search .............. 252/308, 183.11, 314; 524/901, 923

[56] References Cited

U.S. PATENT DOCUMENTS

| | | | |
|---|---|---|---|
| 3,862,894 | 1/1975 | McGuire et al. | 524/901 X |
| 4,037,018 | 7/1977 | McGinniss | 524/901 X |
| 4,391,933 | 7/1983 | Scala et al. | 524/901 X |
| 4,410,601 | 10/1983 | Gaku et al. | 524/923 X |
| 4,425,467 | 1/1984 | Alvino et al. | 525/901 X |

OTHER PUBLICATIONS

United States Air Force Publication AFWAL-TR-8-1-4096, published Sep. 19, 1981.

*Primary Examiner*—Richard D. Lovering
*Attorney, Agent, or Firm*—A. Mich

[57] ABSTRACT

Disclosed is an emulsion having a discontinuous phase which comprises at least two compounds of different structural formula selected from the group consisting of solvent-soluble polymers, oligomers, and monomers dissolved in an organic solvent, and a discontinuous phase which comprises an organic non-solvent for the compounds. A method of coating a conductor with a polymeric alloy is also disclosed. The conductor is immersed in the emulsion and a direct current is applied between the conductor and the emulsion sufficient to cause the discontinuous phase of the emulsion to migrate to the conductor and deposit on it. The conductor is removed from the emulsion and is dried and the deposit is cured.

15 Claims, No Drawings

EMULSIONS FOR ELECTRODEPOSITING POLYMERIC ALLOYS AND COPOLYMERS

BACKGROUND OF THE INVENTION

Graphite fibers are of increasing interest for the construction of structural composites because of their very high strength and high stiffness to weight rations. Performance characteristics of composites depend upon the properties of the materials comprising the composite and the process by which they are combined. Full utilization of the properties of these graphite composites has not been attained because of the weakness of the interphase bonding between the fiber and the matrix. This is due in part to the type of resin used, but also to the wetting of the graphite fiber by the resin.

Generally, graphite fiber or cloth is saturated with the appropriate resin by a dip coating process. Both thermoset and thermoplastic resins have been used to prepare graphite composites. Graphite fibers have also been coated electrophoretically in non-aqueous processes to improve the wetting and impregnation of the graphite by the resin (see U.S. patent application Ser. No. 717,046, filed Mar. 28, 1985, and now U.S. Pat. No. 4,664,768. Attempts to electrophoretically coat graphite fibers from aqueous media have not been very successful because very little resin (only about 1 to 2%) is electrodeposited, and the aqueous medium is deleterious to the fiber.

SUMMARY OF THE INVENTION

We have discovered that copolymers and polymeric alloys can be deposited on graphite and other conductors electrophoretically. (A polymeric alloy is a mixture of two polymers; there is no chemical bonding between the two polymers.) Graphite fibers coated by the process of this invention are wetted by the resin better than in prior processes, and there are fewer voids and pores in the resin. We have also been able to achieve resin content values on graphite cloth of between about 20 and about 50%, far in excess of that achieved by previous processes. Because of this high resin content, the graphite cloth can be stacked and pressed to form a laminate. Laminates prepared according to the process of this invention have a higher impact strength than do laminates prepared by conventional prepegging methods such as dip coating.

While polymeric alloys have been prepared by other methods such as physical blending, the polymeric alloys prepared according to this invention are structurally different from polymers prepared according to prior processes because the polymers are intimately mixed on a molecular basis.

DESCRIPTION OF THE INVENTION

The starting material in the process of this invention is an emulsion that contains a blend of two or more polymerized or polymerizable compounds in the discontinuous phase. That is, the emulsion consists of a discontinuous phase, which is a solvent containing two or more polymers, oligomers, or monomers.

Any two or more solvent-soluble polymers, oligomers, or monomers that are compatible can be used to form an emulsion according to this invention. Polymers are preferred to monomers or oligomers as they give better rheological properties on the conductor in that they are less prone to run off. Compounds are considered to be compatible if they are sufficiently miscible so that separate phases do not form. While the compounds can react after they are deposited on the conductor to form a higher molecular weight polymer or a copolymer, they do not react in the emulsion but exist as separate compounds. Any combination of polymers, oligomers, and monomers may be used, such as, for example, 2 polymers, or 2 monomers, or a polymer and a monomer. Also, the compounds may be of different types, such as an epoxy and a polyester, or they may be of the same type but have different structural formulas such as, for example, two diglycidyl ethers of bisphenol A having different molecular weights. It is often desirable to use two identical compounds of different molecular weights in order to produce a coating on the conductor which has the good properties of the higher molecular weight compound but which is easy to process due to the presence of the lower molecular weight compound. Suitable compounds that can be used in preparing the emulsion include polyesters, epoxies, polysulfones, polyethersulfones, polyimides, polyamide-imides, polyparabanic acids, polycarbonates, elastomer-modified epoxies, polyurethanes, polyethers, polyamide, polyethylene, polytetrafluoroethylene, polypropylene, bismaleimide, triazine, etc. The following pairs of compounds are preferred as they produce coatings with good toughness and high temperature mechanical properties:

polyimides and epoxies
polyamides and epoxies
polyimide elastomers and modified epoxies
polyamide imides and elastomer-modified epoxies
polysulfones and epoxies
polyethersulfones and epoxies
polysulfones and polyimides
polyethersulfones and polyimides
polysulfones and polyamide-imides
polyethersulfones and polyamide-imides
low molecular weight diglycidyl ethers of bisphenol A and high molecular weight diglycidyl ethers of bisphenol A
bismaleimide triazine and polyimides, polyamideimides, epoxies, elastomer-modified epoxies, polysulfones, polyether sulfones, or diglycidyl ethers of bisphenol A Two or more compounds may be mixed in any proportion such as, for example, 1 to 99% by weight (based on total solids weight) of one compound and 1 to 99% by weight of the remaining compounds, but it is preferable to use about 20 to about 80% by weight of one compound and about 20 to about 80% by weight of the remaining compounds in order to take advantage of the properties of both compounds in the resulting coating. If one of the compounds is a monomer or an oligomer, a catalyst is preferably included, as is known by those skilled in the art, so that the monomer or oligomer can polymerize once it has been deposited on the conductor. If one of the compounds is a thermosetting polymer, a catalyst is included, as is known to those skilled in the art, in order to cure or cross-link the polymer once it has been deposited on the conductor.

The solvent is an organic solvent, and it is a solvent for a sufficient amount of the compounds to result in the formation of the emulsion. Suitable solvents include methylene chloride, acetone, dimethylformamide, 2-methylpyrrolidone, 1,1,2-trichloroethane, dimethylsulfoxide, xylene, and decahydronaphthalene. Other suitable solvents will no doubt occur to those skilled in the art.

The non-solvent is also organic and is a non solvent for a sufficient amount of the polymers, oligomers, and monomers to result in the formation of the emulsion. The non-solvent can be miscible or immiscible with the solvent, but it is preferably miscible with the solvent as this tends to result in a coating that is more solvent-free. If the non-solvent is immiscible with the solvent, it may be necessary to include an emulsifier such as a tertiary amine in the emulsion to aid in its formation, as is known in the art. Non-solvents that can be used in forming an emulsion according to this invention include acetonitrile, dimethylformamide, acetone, and other ketones such as methyl ethyl ketone, methyl isobutyl ketone, and cyclohexanone. Whether a particular organic liquid is a solvent or a non-solvent will depend upon the particular polymeric compounds used in forming the emulsion.

The weight ratio of non-solvent to solvent should be about 2 to about 10 as ratios outside this range tend to result in the deposition of less material or produce a less stable emulsion; the preferred weight ratio of non-solvent to solvent is about 3.5 to about 4.5. The emulsion should contain about 0.5 to about 1.5 wt.% solids based on the total emulsion weight. If less than about 0.5% solids are present, the electrodeposition process will still work but it will take a rather long time, and if more than 1.5% solids are present, the emulsion tends to be less stable; preferably, the percent solids is about 0.9 to about 1.1.

While an emulsifier is preferably not present, about 0.5 to about 1 wt.% (based on solids) of an emulsifier can be used when the solvent and non-solvent are immiscible or when the emulsion does not readily form. Preferably, the amount of emulsifier is about 0.1 to about 0.3% by weight.

In preparing the emulsion, the solid materials are dissolved in the solvent and the resulting solution is mixed with the non-solvent. If it is desirable to have the different polymeric materials in different droplets in the emulsion, they are dissolved in separate solvents and the separate solvents are added separately to the non-solvent. It may be necessary to heat and stir the mixture in order to emulsify the components.

The conductor can be of any shape including a flat surface, individual fibers, mat, roving, or woven cloth. It can also be of any material that conducts electricity including metals, graphite, boron, and silicon. Graphite fibers that are woven into cloth are the preferred conductor because they have a high specific modulus and a high specific strength which makes them very useful in forming laminates for aerospace applications.

The conductor is coated by immersing it in the emulsion and applying a direct current between the conductor and an electrode in contact with the emulsion. The conductor can be either the anode or the cathode, depending upon the particular materials used, but most commonly, the conductor will be the anode. A voltage of about 1 to about 500 volts is suitable. The current is applied until the desired thickness of coating on the conductor has been achieved or until additional material will not deposit on the conductor. The conductor may be coated in either a continuous or batch process.

After the conductor is coated, it is removed and dried. If the conductor is coated with a thermoplastic material, it is heated to fuse or melt the thermoplastic and form a smooth coating on the conductor. If the conductor has been coated with a monomer, oligomer, or reactive or cross-linkable polymers, it is heated to polymerize, react, or cross-link the polymeric material in the coating.

If a laminate is to be made, the conductor is preferably a woven cloth. The process of this invention will deposit sufficient resin on the cloth to permit the cloth to be used directly in forming the laminate. Sheets of the cloth are stacked, heated, and pressed to form the laminate. In addition to preparing laminates, the process of this invention can also be used to make coatings on metal surfaces, as insulation on metals, and as wire enamel on wires. It can also be used to coat graphite fibers for use in making articles by filament winding.

The following examples further illustrate this invention.

EXAMPLE 1

An emulsion was prepared by adding a solution of 1360 g N-methylpyrrolidone (NMP) and 61.48 g of a low molecular weight or a high molecular weight polyethersulfone sold by ICI Chemical Corporation under the trade designations "Vitrex 100P" or "Vitrex 300P," respectively, from a separator funnel to 4788 g of stirred acetone. Graphite cloth $7\frac{1}{4}'' \times 9''$ was immersed into emulsion so that the immersed portion was $7\frac{1}{4}'' \times 8''$. The cathode was an expanded nickel screen 9" long $\times 4\frac{3}{4}''$ wide. Electrode separation was 3". A potential was applied for varying times and the coated cloth was dried in an oven using the following schedule: 5 min 75° C. +5 min 75°–100° C. +5 min 100°–125° C.+5 min 125°–150° C.+10 min 150°–180° C. The results of this electrocoating procedure are shown in Tables 1 and 2.

TABLE 1

"VICTREX 100P" ON GRAPHITE CLOTH

| Graphite Cloth | Time (Mins) & Voltage (dc) | Current mA | Coulombs | Resin Content, wt. % |
|---|---|---|---|---|
| A | 10 50–150 | — | — | 43 |
| B | 8 150 | 160–155 | 92 | 39 |
| C | 10 ½ 150 | 162–160 | 124 | 38 |
| D | 10 150 | 156–150 | 116 | 31 |
| E | 8 150 | 160–158 | 100 | 22 |
| F | 9 150 | 165–160 | 109 | 33 |
| G | 10 150 | 170–168 | 122 | 30 |
| H | 12 150 | 180–178 | 141 | 26 |
| I | 9 150 | 100–90 | 59 | 40 |
| J | 11 150 | 98–90 | 65 | 40 |
| K | 10 ½ 150 | 90–83 | 60 | 35 |
| L | 14 150 | 85–75 | 72 | 35 |
| M | 13 ½ 150 | 98–86 | 79 | 33 |
| N | 14 150 | 100–87 | 93 | 24 |

TABLE 2

"VICTREX 300P" ON GRAPHITE CLOTH

| Graphite Cloth | Time (Mins) & Voltage (dc) | Current mA | Coulombs | Resin Content, wt % |
|---|---|---|---|---|
| A | 8 150 | 58–52 | 31 | 31 |
| B | 9 150 | 55–49 | 32 | 30 |
| C | 11 150 | 55–48 | 39 | 33 |
| D | 9 ½ 200 | 73–60 | 45 | 37 |
| E | 10 200 | 69–56 | 45 | 36 |
| F | 8 200 | 82–73 | 46 | 34 |
| G | 9 200 | 79–69 | 49 | 29 |
| H | 11 200 | 78–64 | 58 | 28 |
| I | 13 200 | 75–61 | 64 | 24 |
| J | 11 250 | 92–72 | 66 | 24 |
| K | 13 300 | 110–86 | 91 | 23 |
| L | 7-200 | 72–66 | 33 | 47 |
| M | 7 ½ 200 | 69–64 | 34 | 40 |
| N | 6 250 | 86–79 | 34 | 41 |
| O | 6 ½ 250 | 85–76 | 35 | 38 |

TABLE 2-continued

"VICTREX 300P" ON GRAPHITE CLOTH

| Graphite Cloth | Time (Mins) & Voltage (dc) | Current mA | Coulombs | Resin Content, wt % |
|---|---|---|---|---|
| P | 7  250 | 81-74 | 36 | 32 |

EXAMPLE 2

In another experiment, the graphite cloth was stacked in the warp and fill direction such that the stacking symmetry was maintained about the center of the laminates. Specimens were cut in the warp and fill directions relative to the outside ply in all applicable cases. The coated graphite cloth described in Tables 1 and 2 was converted to a laminate by stacking the 6"×6" pieces of coated graphite cloth, 14 plies in all, alternately in a warp and fill direction and placing them in a cold press. A pressure of 1,000 psi was applied and the press was heated to 450° F. (about ½ hr). The laminates were held at 450° F. and 1,000 psi for 1 hr and were cooled to room temperature under pressure with cold water (approximately 1 hr). Impact tests were run on the laminates by machining specimens parallel to the mutually perpendicular edges of the laminate; the results are shown in Table 3.

TABLE 3

| Components | Energy (in-lb/in$^2$) | | | |
|---|---|---|---|---|
| | Initiation | | Total | |
| | Fill Direction | Warp Direction | Fill Direction | Warp Direction |
| Polysulfone - "300P" | 180 | 100 | 900 | 580 |
| Commercial System | 440 | 240 | 920 | 775 |
| Polysulfone - "100P" | 180 | 265 | 1010 | 1140 |

As can be seen from Table 3, graphite-polyethersulfone "100P" composite was tougher than the Commercial System in both directions since the total energy absorbed is higher. (The Commercial System is sold by Hercules, and is believed to be type AS4 woven graphite fiber impregnated with N,N,N',N'-tetraglycidyl ether of diamino diphenyl methane sold by Ciba-Gigy under the trade designation "MY720" cured with diamino diphenyl sulfone.)

EXAMPLE 3

In another experiment, weight loss as a function of exposure temperature was measured for the three systems. The following table gives temperatures that resulted in a 1% weight loss. Measurements were conducted on thermogravimetric analysis equipment.

| Laminate Materials | Temperature |
|---|---|
| "300P" + graphite cloth | 300° F. |
| "100P" + graphite cloth | 320° F. |
| Commercial System | 270° F. |

From the above table, it is clear that laminates made from polyethersulfones ("100P" and "300P") possess superior thermal stability over the Commercial System so widely used in the aerospace industry.

EXAMPLE 4

Dimethylformamide (540 g) was heated to 80° C. and 120 g of "Victres 100P" was slowly added (about 10 g/min) and stirred until it had all dissolved (about 10 minutes). At this point, 280 g of "MY-720," heated to 80° C., was added, and stirring was continued at that temperature for 45 minutes. The dark amber solution was cooled to room temperature. A homogeneous solution was obtained. This composition contained a weight ratio of epoxy to polyethersulfone of (2:1), and had a solids content of 50%.

EXAMPLE 5

A second composition was prepared as described in Example 4 except that the weight ratio of epoxy to polyethersulfone was 1 to 2.33. The composition was as follows:
Dimethylformamide (DMF)=690 g
"Victrex 100P"=280 g
Diaminodiphenyl sulfone=60 g
"MY-720"=120 g

EXAMPLE 6

Milky colored emulsions were prepared by diluting the solutions in Examples 4 and 5 with DMF and adding them slowly from a separatory funnel to a stirred acetone solution. The compositions of the various emulsions are shown in Table 4.

TABLE 4

| No. | Solution From Experiment 4(g) | Solution From Experiment 5(g) | DMF (g) | Acetone (g) | Non-Solvent to Solvent Ratio | Solids Wt. % |
|---|---|---|---|---|---|---|
| 1 | 5 | | 73 | 174.5 | 2.31 | 0.99 |
| 2 | 5 | | 68 | 179.5 | 2.54 | 0.99 |
| 3 | 5 | | 63 | 184.5 | 2.81 | 0.99 |
| 4 | 5 | | 58 | 189.5 | 3.13 | 0.99 |
| 5 | 5 | | 53 | 194.5 | 3.50 | 0.99 |
| 6 | 5 | | 48 | 199.5 | 3.95 | 0.99 |
| 7 | 5 | | 43 | 204.5 | 4.49 | 0.99 |
| 8 | 5 | | 33 | 214.5 | 6.04 | 0.99 |
| 9 | | 5 | 58.5 | 135.1 | 2.19 | 1.0 |
| 10 | | 5 | 50.5 | 143.1 | 2.70 | 1.0 |
| 11 | | 5 | 42.5 | 151.1 | 3.30 | 1.0 |
| 12 | | 5 | 34.5 | 159.1 | 4.24 | 1.0 |
| 13 | | 5 | 26.5 | 167.1 | 5.66 | 1.0 |

Electrodeposition was carried out at constant voltage in a Pyrex glass beaker. The anode was an aluminum rod (Type 6061T6) 0.250" in diameter and 8" long which was immersed in the emulsion to a depth of 2". A circular nickel screen designated (10Ni 12-2/0) served as the cathode and was placed around the anode such that the electrode separation was 1".

Aluminum rods were immersed in each of the emulsions and 300 Vdc were applied for 1 minute. The coated rods were dried 5 minutes at 100° C.+5 minutes 100°-150° C. and weighed. The results are given in Table 5.

TABLE 5

| No.* | Weight of Electrodeposited Coating, mg |
|---|---|
| 1 | 39 |
| 2 | 46 |
| 3 | 51 |
| 4 | 55 |
| 5 | 55 |
| 6 | 55 |
| 7 | 56 |
| 8 | 48 |
| 9 | 52 |
| 10 | 51 |
| 11 | 63 |
| 12 | 55 |

TABLE 5-continued

| No.* | Weight of Electrodeposited Coating, mg |
|---|---|
| 13 | 45 |

*These numbers correspond to those in Table 4.

EXAMPLE 7

Emulsions A and B were used to coat the cloth. The compositions are as follows:

| Ingredient | Emulsion A(g) | Emulsion B(g) |
|---|---|---|
| Solution from Expt. 4 | 125 | — |
| Solution from Expt. 5 | — | 150 |
| DMF | 1325 | 1275 |
| Acetone | 3862.5 | 4533 |

Graphite cloth designated "A370-5H" from Hercul Corp., about 20 mils thick, was cut into 7"×9" pieces and immersed into the emulsions in a polyethylene container. The cathodes were of the same nickel screen material described in Example 5. The cathode was 5" wide and 8½" long and the electrode separation was 3". The data for the electrocoating of the graphite cloth is shown in Table 6.

TABLE 6

| No. | Voltage | Time, (Mins) | Current (mA) | Coulombs | Resin Content of Coated Graphite (g) |
|---|---|---|---|---|---|
| 1 | 300 | 10 | 160–95 | 104 | 24 |
| 2 | 300 | 13 | 160–80 | 108 | 22 |
| 3 | 300 | 18 | 110–55 | 97 | 15 |
| 4 | 300 | 36 | 80–50 | 144 | 15 |
| 5 | 300 | 10 | 165–120 | 127 | 32 |
| 6 | 300 | 17 | 160–65 | 128 | 26 |
| 7 | 300 | 25 | 100–50 | 128 | 17 |
| 8 | 300 | 34 | 60–40 | 128 | 11 |
| 9 | 300 | 10 | 240–110 | 122 | 30 |
| 10 | 300 | 22 | 140–45 | 123 | 26 |
| 11 | 300 | 32 | 80–40 | 122 | 16 |
| 12 | 300 | 52 | 50–25 | 143 | 8 |
| 13 | 300 | 10 | 220–110 | 113 | 30 |
| 14 | 300 | 15½ | 160–95 | 114 | 23 |
| 15 | 300 | 24½ | 110–40 | 114 | 17 |
| 16 | 300 | 50 | 70–25 | 146 | 15 |

EXAMPLE 8

An emulsion was prepared which consisted of 150 g of a polyimide sold by Upjohn Chem. Co. as a 22% solution in NMP under the trade designation "PI-2080," 130 g of N-methyl pyrrolidone, and 4500 g of acetone. Graphite cloth was electrocoated with this emulsion. The results are presented in Table 7.

TABLE 7

| No. | Voltage | Time | Current (mA) | Coulombs | Resin Content of Coated Graphite (wt. %) |
|---|---|---|---|---|---|
| 1 | 100 | 35 sec | 170–145 | 6.5 | 2.0 |
| 2 | 100 | 7 min | 150–120 | 77 | 24 |
| 3 | 100 | 10 min | 140–110 | 98 | 28 |
| 4 | 100 | 12 min | 130–100 | 118 | 31 |
| 5 | 100 | 14½ min | 130–100 | 147 | 31 |
| 6 | 100 | 20 min | 125–100 | 156 | 30 |
| 7 | 100 | 20½ min | 125–100 | 167 | 24 |
| 8 | 100 | 22 | 125–100 | 188 | 21 |
| 9 | 100 | 35 | 110–80 | 214 | 18 |
| 10 | 100 | 8 | 150–120 | 88 | 27 |
| 11 | 100 | 14 | 130–95 | 113 | 39 |
| 12 | 100 | 14 | 130–95 | 115 | 32 |
| 13 | 100 | 16 | 130–95 | 127 | 31 |
| 14 | 100 | 17 | 125–90 | 133 | 27 |
| 15 | 100 | 17½ | 130–90 | 145 | 23 |
| 16 | 100 | 21½ | 110–80 | 164 | 18 |

The coated graphite was dried in an oven for 5 minutes at 70° C., 5 minutes at 70° to 100° C., 5 minutes at 100° to 150° C. and 5 minutes at 150°–200° C.

EXAMPLE 9

Polymer blends of different polymers were prepared by dissolving the polymers in a suitable solvent. Table 8 gives these compositions.

TABLE 8

| Ingredient | A | B | C | D |
|---|---|---|---|---|
| "MY-720" | 10 g | | 10 g | |
| "PI-2080" | 2.5 g | 12 g | 5 g | 5 g |
| "Victrex 100P" | | 3 g | | 5 g |
| Bismaleimide resin | | | | 5 g |
| DMF | 34 g | 35 g | 23 g | 85 g |

Using the blends in Table 8 emulsions were prepared by adding the blends to acetone. The composition of these emulsions is given in Table 9.

TABLE 9

| Ingredient | Emulsion A | Emulsion B | Emulsion C | Emulsion D |
|---|---|---|---|---|
| Solution A | 10 g | | | |
| Solution B | | 10 g | | |
| Solution C | | | 8 g | |
| Solution D | | | | 12 g |
| DMF | 55 g | 25 g | 58 g | 26 g |
| Acetone | 181 g | 82 g | 191 g | 85 g |

Aluminum rods were electrocoated with these emulsions. The electrocoating procedure is described in Experiment 7. A voltage of 300 Vdc was applied for 15 to 30 seconds. In all cases a heavy coating was deposited on the anode.

EXAMPLE 10

Using the electrocoated graphite cloth prepared in Experiment 8, a laminate was prepared. The graphite cloth was stacked in the warp and fill direction such that the stacking symmetry was maintained about the center of the laminates. Specimens were cut in the warp and fill directions relative to the outside ply in all applicable cases.

The 6"×6" pieces of the coated cloth, 14 plies in all, were stacked alternately in a warp and fill direction and placed in a preheated press (590° F.). Pressure (4500 psi) was applied and the temperature was raised to 670° F. Upon reaching this temperature (about 10 minutes) the laminate was held at this temperature for another 5 minutes. The laminate was allowed to cool under pressure to a temperature of 590° F. (about 15 minutes) and further cooled to 300° F., at which point the cooling water was turned on and further cooled to room temperature.

EXAMPLE 11

Another laminate was prepared using the electrocoated graphite cloth prepared in Experiment 7. The graphite cloth was stacked in the warp and fill direction such that the stacking symmetry was maintained about the center of the laminates. Specimens were cut in the warp and fill directions relative to the outside ply in all applicable cases. Fourteen plies of 6"×6" cloth were stacked alternately in the warp and fill direction. The stack was placed in a cold press and pressure (1000 psi) was applied. The press was heated to 350° F. (30 minutes) and the laminate held for 2 hrs at temperature and pressure before cooling with water to room temperature. The laminates prepared in Experiments 10 and 11 were tested and the results shown in Table 10.

TABLE 10

| Components | Energy (in-lb/in$^2$) | | | |
| --- | --- | --- | --- | --- |
| | Initiation | | Total | |
| | Fill Direction | Warp Direction | Fill Direction | Warp Direction |
| Upjohn "2080" | 90 | 230 | 740 | 860 |
| "MY-720" - "100P" | 160 | 185 | 690 | 590 |

As shown in Table 10, crack initiation energy for the two systems is similar to the Commercial System, but total energy to failure is lower than the Commercial System. This may be due to higher percentage of voids and lower resin contents found in these laminates. Table 11 lists volume percentages of reinforcement, matrix, and voids.

TABLE 11

| | Laminate Type | Reinforcement Volume % (ml) | Matrix Volume % (ml) | Void Volume % (ml) |
| --- | --- | --- | --- | --- |
| 1. | Polyethersulfone, "100P" and graphite cloth | 58.0 | 38.0 | 4.0 |
| 2. | Polyethersulfone, "300P" and graphite cloth | 64.5 | 32.5 | 3.0 |
| 3. | Upjohn "2080" and graphite cloth | 68.0 | 24.6 | 7.4 |
| 4. | "MY-720", Polyethersulfone "100P" and cured with | 70.0 | 21.0 | 9.0 |
| 5. | Commercial System | 61.0 | 36.0 | 3.0 |

We claim:

1. A method of making an emulsion from which an interpenetrating polymeric network can be electrodeposited comprising:
   (A) forming at least two separate solutions in organic solvents, each of said solutions containing at least one compound that is structurally different from a compound dissolved in another of said solutions, said compounds being selected from the group consisting of organic solvent-soluble polymers, oligomers, and monomers;
   (B) mixing each of said solutions separately with a non-solvent for said compounds to form at least two separate emulsions; and
   (C) mixing together said separate emulsions to form a single emulsion without reacting said compounds.

2. A method according to claim 1, performed at room temperature.

3. An emulsion having a discontinuous phase which comprises at least two compounds of different structural formula selected from the group consisting of organic solvent-soluble polymers, oligomers, and monomers, dissolved in an organic solvent, where said compounds are non-reactive with each other in said emulsion, and a continuous phase which comprises an organic non-solvent for said compounds.

4. An emulsion according to claim 3 wherein at least one of said compounds is thermosetting and at least one of said compounds is thermoplastic.

5. An emulsion according to claim 3 wherein said discontinuous phase consists of droplets, a majority of which contain only one of said compounds.

6. An emulsion according to claim 5 wherein said compounds are co-reactive when they are deposited on a surface.

7. An emulsion according to claim 3 wherein said discontinuous phase consists of droplets, a majority of which contain more than one of said compounds.

8. An emulsion according to claim 3 wherein said compounds are a pair of compound selected from the group consisting of
   (A) polyimides and epoxies,
   (B) polyamide-imides and epoxies,
   (C) polyimides and elastomer-modified epoxies,
   (D) polyamide-imides and elastomer-modified epoxies,
   (E) polysulfones and epoxies,
   (F) polyethersulfones and epoxies,
   (G) polysulfones and polyimides,
   (H) polyethersulfones and polyamide-imides,
   (I) diglycidyl ethers of different molecular weight, and
   (J) bismaleimide triazine and a compound selected from the group consisting of polyimides, polyamide-imides, epoxies, elastomer-modified epoxies, polysulfones, polyethersulfones, and mixtures thereof.

9. An emulsion according to claim 3 wherein said solvent and said non-solvent are miscible.

10. An emulsion having:
    (I) a discontinuous phase of droplets, where each droplet comprises
       (A) about 1 to about 99% by weight based on total solids of a first compound selected from the group consisting of organic solvent-soluble polymers, oligomers, monomers, and mixtures thereof;
       (B) about 1 to about 99% by weight based on total solids of a second compound selected from the group consisting of organic solvent-soluble polymers, oligomers, monomers, and mixtures thereof, where the structural formula of said second compound is different from the structural formula of said first compound, and said first compound is not reactive with said second compound in said emulsion; and
       (C) a solvent for said first and second compounds; and
    (II) a continuous phase which comprises a non-solvent for said first and second compounds, where the weight ratio of said non-solvent to said solvent is about 2 to about 10, and where the weight percent solids in said emulsion based on emulsion weight is about 0.5 to about 1.5.

11. An emulsion according to claim 10 wherein said weight ratio of said non-solvent to said solvent is about 3.5 to about 4.5, and said weight percent solids in said emulsion based on emulsion weight is about 0.9 to about 1.1.

12. An emulsion according to claim 10 wherein said discontinuous phase comprises about 20 to about 80% by weight said first compound and about 20 to about 80% by weight of said second compound.

13. An emulsion according to claim 10 wherein a pair of said first and second compounds is selected from the group consisting of polyimides and epoxies; polyamide-imides and epoxies, polyimides and elastomer-modified epoxies, polyamideimides and elastomer-modified epoxies, polysulfones and epoxies, polyethersulfones and epoxies, polysulfones and polyimides, polyethersulfones and polyamide-imides, diglycidyl ethers of different molecular weight, and bismaleimide triazine and a compound selected from the group consisting of polyimides, polyamide-imides, epoxies, elastomer-modified epoxies, polysulfones, polyethersulfones, and mixtures thereof.

14. An emulsion having:
   (I) a discontinuous phase which comprises:
      (A) droplets of a solution of a first compound selected from the group consisting of organic solvent-soluble polymers, oligomers, monomers, and mixtures thereof; and
      (B) separate droplets of a solution of a second compound selected from the group consisting of organic solvent-soluble polymers, oligomers, monomers, and mixtures thereof, where the structural formula of said second compound is different from the structural formula of said first compound, and where no reaction occurs between said first compound and said second compound in said emulsion, and where said first compound and said second compound are each about 1 to about 99% by weight based on total solids of said emulsion weight; and
   (II) a continuous phase which comprises a non-solvent for said first and second compounds, where the weight ratio of said non-solvent to said solvent is about 2 to about 10, and where the weight percent solids in said emulsion based on emulsion weight is about 0.5 to about 1.5.

15. An emulsion according to claim 14 wherein a pair of said first and second compounds is selected from the group consisting of polyimides and epoxies; polyamide-imides and epoxies, polyimides and elastomer-modified epoxies, polyamide-imides and elastomer-modified epoxies, polysulfones and epoxies, polyethersulfones and epoxies, polysulfones and polyimides, polyethersulfones and polyamide-imides, diglycidyl ethers of different molecular weight, and bismaleimide triazine and a compound selected from the group consisting of polyimides, polyamide-imides, epoxies, elastomer-modified epoxies, polysulfones, polyethersulfones, and mixtures thereof.

* * * * *